Jan. 2, 1951  J. BROWN  2,536,623
SEALING DEVICE FOR ROTATING SHAFTS OF MACHINERY
Filed April 24, 1945  2 Sheets-Sheet 1

Inventor.
JOSEPH BROWN.
By: Francis E. Boyce
ATTORNEY.

Jan. 2, 1951 J. BROWN 2,536,623
SEALING DEVICE FOR ROTATING SHAFTS OF MACHINERY
Filed April 24, 1945 2 Sheets-Sheet 2
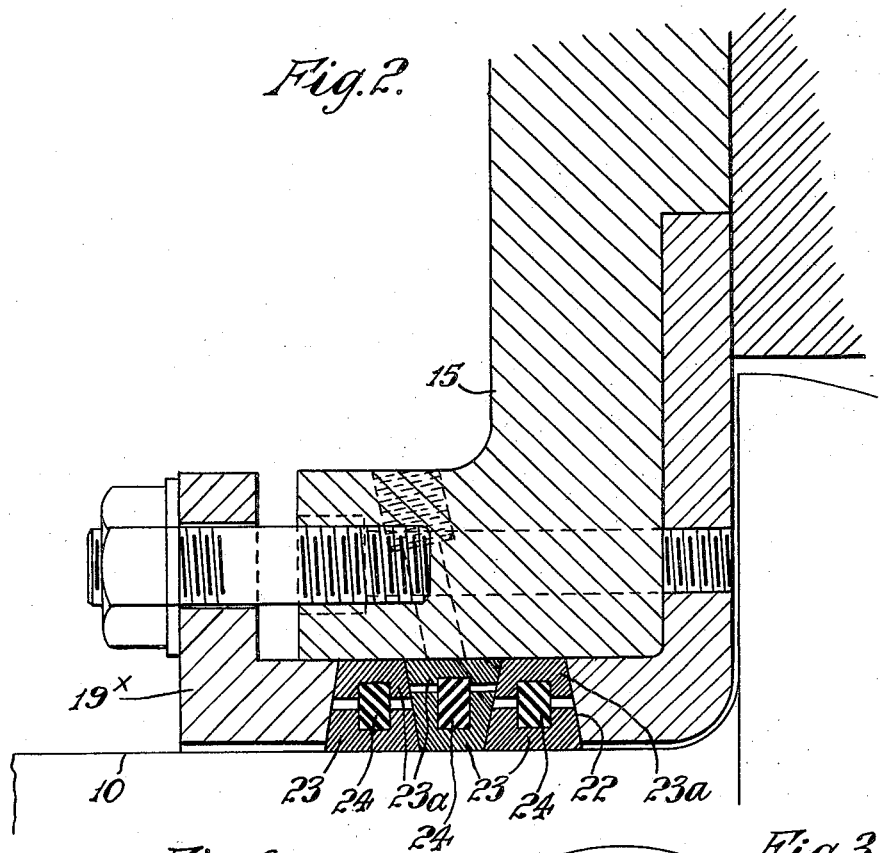
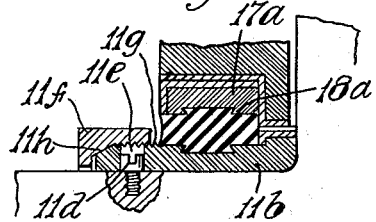
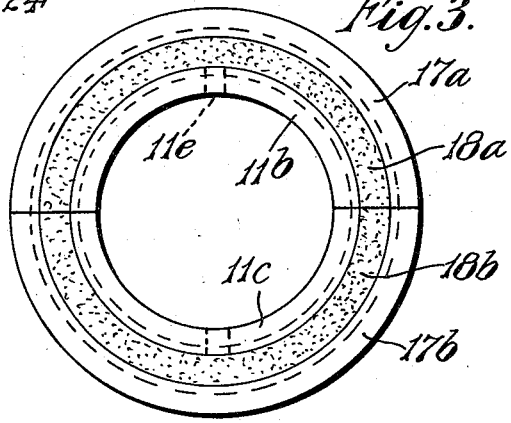
Inventor.
JOSEPH BROWN.
By: Francis E. Boyer
ATTORNEY.

Patented Jan. 2, 1951

2,536,623

UNITED STATES PATENT OFFICE 2,536,623

SEALING DEVICE FOR ROTATING SHAFTS OF MACHINERY

Joseph Brown, Castleton, Rochdale, England, assignor to David Bridge & Company Limited, Castleton, Rochdale, England, a British company Application April 24, 1945, Serial No. 590,054
In Great Britain April 15, 1944

Section 1, Public Law 690, August 8, 1946
Patent expires April 15, 1964

1 Claim. (Cl. 286—7)

This invention relates to sealing assemblies for the shafts of machinery in which it is desirable to allow for a limited amount of axial movement of a shaft and for movement due to radial thrusts.

In machines for masticating rubber, rubber substitutes or other plastic materials or for mixing the same or other powdered materials, pastes, semi-liquids or liquids, it is well known that the mechanical pressures developed in the masticating or mixing chamber during use force some of the material out of the masticating or mixing chamber between the rotating shaft or shafts of the masticating or mixing element or elements and the wall or walls of the said chamber through which the shaft or shafts extend. Thus there is an ever present liability of some of the material being operated upon, being forced out of the mixing chamber or into the main shaft bearings of the machine to set up excessive friction with the attendant disadvantages of increased and rapid wear and overheating of the bearings as well as a reduction in the overall mechanical efficiency of the installation.

The object of the present invention is to provide an improved sealing or packing assembly for use in connection with rotatable shafts which are subject to a limited amount of axial or radial movement due to loads, the said assembly being of such a nature as to accommodate the axial and/or radial movement without disturbance of the seal.

According to the invention a sealing assembly for two relatively rotatable members such as a rotatable shaft in a housing comprises a sealing contact surface on one member, at least one annular sealing ring of relatively non-compressible material carried by the other member and engaging the said sealing contact surface, and resilient carrying means on said other member for the said sealing ring, said resilient means permitting radial movement between the sealing ring and the member by which it is carried.

Preferably the housing provides a channel-like location for the sealing ring and the resilient element is so constructed as to permit axial as well as radial displacement of the annular sealing ring relative to the part by which it is carried. The invention includes duplication of the annular sealing ring so that a floating sealing construction is provided.

Three examples of sealing assemblies according to the foregoing will now be described with reference to the accompanying drawings.

In said drawings—

Fig. 2 is a similar view showing a modification;

Fig. 3 shows in end view a modification of the sealing ring of Fig. 1.

Fig. 4 is a sectional elevation showing mounting means for the ring shown in Fig. 3.

Figure 1:
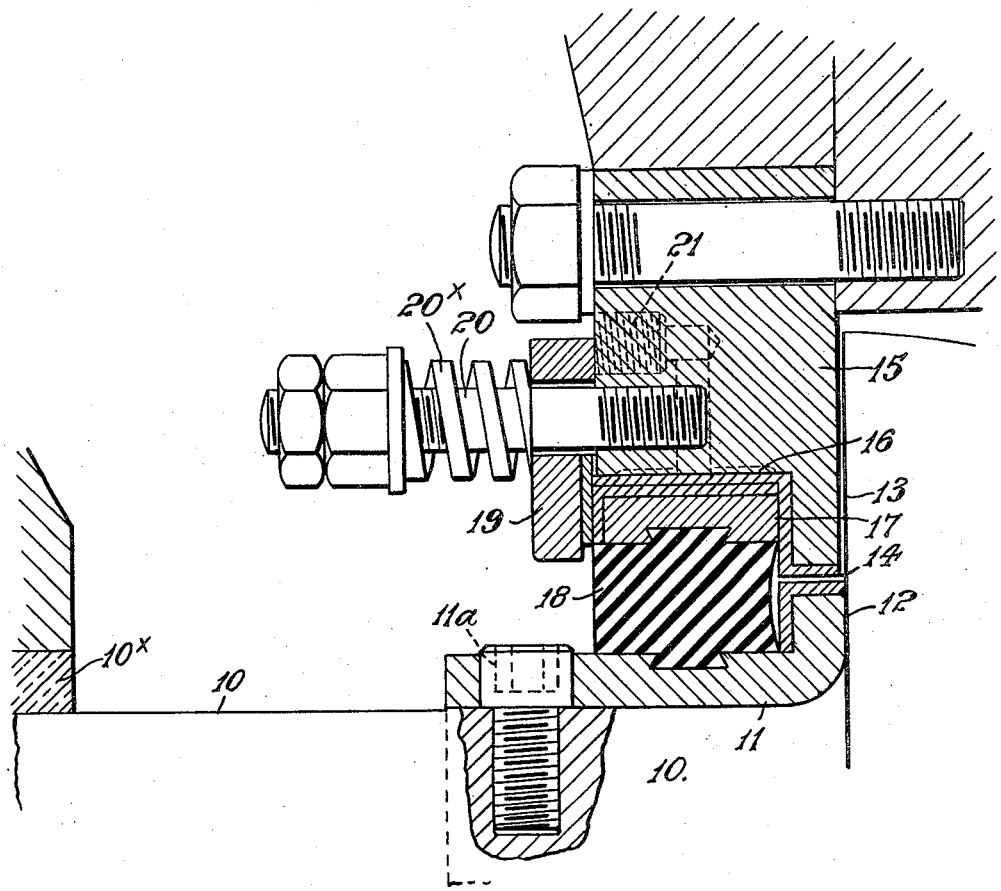
Fig. 1 is a sectional elevation showing one construction according to the invention.

In the example of the invention as shown in Fig. 1 and as applied to a mixing machine of the well known "Banbury" type, which type includes a mixing chamber and rotors or mixing elements therewithin having shafts at each end thereof extending through the end frames of the mixing chamber and supported in bearings located on the outside of and adjacent to the said end frames, the shafts are provided with the improved sealing means in the manner hereinafter described. Each shaft 10 has fitted thereon and secured thereto, so as to rotate therewith, a metal ring or sleeve 11 formed at one end with a radially-extending flange 12, the said flange being arranged to abut the adjacent side face of the rotor 13 at the inner end of the shaft and to fit closely but rotatably within the aperture 14 in the end frame 15 of the mixing chamber through which the shaft extends. The said aperture in the end frame is counterbored from the outside of the latter to provide a housing 16 for an annular metal sealing ring 17, which is resiliently mounted upon the aforesaid ring or sleeve 11. The ring or sleeve 11 is shown secured by a screw 11a. The resilient mounting for the sealing ring 17 is achieved by interposing an annulus 18 of rubber between the ring or sleeve 11 on the shaft 10 and the sealing ring 17. This assembly, comprising the ring or sleeve 11, rubber annulus 18 and sealing ring 17, is pre-formed as a unit, the rubber being bonded to the outer surface of the first-mentioned member and to the inner surface of the last-mentioned member and completely filling the annular space between the two members and also abutting the outwardly presented face of the radially-extending flange 12 on the sleeve. A keep plate 19 is arranged concentrically with the shaft and secured to the end frame of the mixing chamber by studs 20, being formed so as to overlie the edge of the metal sealing ring 17 and bear upon the latter to restrain it from movement axially of the shaft 10 except as allowed by the clearance necessary to permit the rotation of the ring within the housing. The keep plate and housing together form an annular channel and the periphery and edges of the sealing ring located therein as well as the peripheral edge of the radial flange on the sleeve are case hardened to minimise wear of these parts or, as shown, the wearing surfaces of the said parts may be faced with anti-friction metal.

The faces of the stationary and rotating parts can be conveniently lubricated through a tapped hole 21.

It will be seen that in the above-described construction of sealing assembly, the shaft 10 is permitted to move or be displaced relatively to the sealing ring 17 under the influence of both axial and radial thrust pressures without effecting any disturbance of the said ring such as would allow leakage of material from the mixing chamber.

In the construction described the keep plate is urged by springs 20x into contact with the adjacent edge of the sealing ring, the springs being arranged between the outer face of the keep plate and the nuts on the studs 20 by which such plate is carried. By this means the pressure of the keep plate on the sealing ring may be adjusted, and any "play" between the two parts is automatically "taken up." Further, the bearings for supporting the shaft 10 are marked 10x.

In the example of the invention shown in Fig. 2, which is also adapted to be applied to a mixing machine of the type referred to, a plurality of composite non-compressible sealing rings is provided, which rings are arranged side by side and are housed in a recess 22 in the end frame 15 of the mixing chamber in the manner hereinafter described. Each of the composite sealing rings comprises an inner and an outer ring 23, 23a, the two rings being made of metal and being secured concentrically and resiliently together by a rubber annulus 24 which is bonded to their opposed faces as hereinbefore mentioned. The several parts of each composite ring are of such shape as to give the said ring a wedge-like cross-sectional form, and when the several composite rings are assembled within the housing recess 22 their arrangement is such that the wider parts of adjacent rings are oppositely disposed. Thus, in the case illustrated where three such rings are provided the middle ring is formed with its wider part at the outer periphery and the adjacent side rings are formed with their wider parts at their inner peripheries which fit around the shaft. In this construction the sealing rings are retained in the housing by a keep plate 19x as previously described but they are not secured to the shaft 10 to rotate therewith, instead, the shaft is able to rotate within the rings. The pressure of the keep plate on the outermost ring holds them in intimate contact and self-alignment may take place sufficient to ensure effective contact over the whole of their faces and thus reduce the risk of leakage. The rings are preferably split, for example radially to allow further relative movement.

It is to be understood that the improved sealing assembly described in the foregoing examples is applied to the shafts at each end of each rotor, thus, in the particular type of machine referred to there are two rotors so that four such sealing assemblies would be provided.

The sealing rings may be made of any convenient and suitable metal, for example, steel, brass or phosphor-bronze and in some cases where it is desirable to minimise friction it may be expedient to make them of a bearing metal alloy or of an impregnated bearing metal.

A modified form of sealing assembly within the scope of the present invention may be constructed as shown in Figs. 3 and 4, in which the sealing ring 17, instead of being formed as a unitary circular element, is comprised by two segments adapted to be placed together to provide a ring in a manner resembling the common practice of bearing construction. In this case each segment will be constructed with inner metal parts 11b and 11c and outer metal parts 17a and 17b with interposed or sandwiched parts 18a and 18b of rubber which are bonded to the opposed faces of the said metal parts, as previously described. The parts of the ring are each located by a recessed stud 11d for hole 11e in the inner parts of the ring and are secured by clamping ring 11f which screws onto the parts at 11g and engages a taper 11h.

The term "rubber," where used in this specification, is to be taken as including "synthetic" rubber and rubber substitutes and any resilient media that can be satisfactorily "bonded" or welded to the harder associated components.

Although the invention has been hereinbefore described with reference to and in connection with masticating or mixing machines, it is not to be inferred that the application of the invention is limited to such machines, indeed, it is intended that the scope of the monopoly to be claimed shall cover the application of the improved device to all cases in which it is desired to seal a rotatable shaft within the housing.

I declare that what I claim is:

A sealing assembly for a rotatable shaft in a housing, comprising a flanged ring adapted to be secured to the shaft, an annular sealing ring of relatively non-compressible material surrounding and arranged radially concentric with the flanged ring, a resilient ring arranged between and interlocked with the flanged ring and the sealing ring and spacing said rings radially from each other, said housing having a recess receiving said sealing ring, and a cylindrical closure ring adapted with said recess to form an annular channel for the sealing ring, and resilient means urging said closure ring against the sealing ring.

JOSEPH BROWN.

REFERENCES CITED

The following references are of record in the file of this patent:

UNITED STATES PATENTS

| Number | Name | Date |
|---|---|---|
| 784,867 | Law | Mar. 14, 1905 |
| 1,606,124 | Hornsey | Nov. 9, 1926 |
| 1,696,938 | Curtis | Jan. 1, 1929 |
| 1,851,032 | Bischof | Mar. 29, 1932 |
| 2,368,380 | Ruzicka | Jan. 30, 1945 |

FOREIGN PATENTS

| Number | Country | Date |
|---|---|---|
| 862,047 | France | of 1940 |